United States Patent [19]

Clark

[11] 4,235,383
[45] Nov. 25, 1980

[54] TIRE DISINTEGRATOR

[76] Inventor: Richard F. Clark, 3620 Oakwood Dr., Bettendorf, Iowa 52722

[21] Appl. No.: 63,222

[22] Filed: Aug. 3, 1979

[51] Int. Cl.³ .......................................... B02C 18/22
[52] U.S. Cl. .................................... 241/38; 241/224; 241/236; 241/DIG. 31
[58] Field of Search ................ 241/38, 222, 224, 236, 241/DIG. 31; 51/DIG. 33

[56] References Cited

U.S. PATENT DOCUMENTS

| | | | |
|---|---|---|---|
| 2,753,908 | 7/1956 | Anderson | 241/236 X |
| 3,656,697 | 4/1972 | Nelson | 241/DIG. 31 |
| 3,727,850 | 4/1973 | Krigbaum | 241/236 X |
| 4,134,556 | 1/1979 | Ehrlich et al. | 241/DIG. 31 |
| 4,142,688 | 3/1979 | Johnson et al. | 241/236 |

*Primary Examiner*—Howard N. Goldberg
*Attorney, Agent, or Firm*—Nathan Edelberg; Robert P. Gibson; Robert O. Richardson

[57] ABSTRACT

A tire disintegrator having rows of abrasive counterrotating wheels between and over which defective tires are passed to be ground into particles or residue for disposal or recycling into new tire products and road resurfacing materials.

5 Claims, 6 Drawing Figures

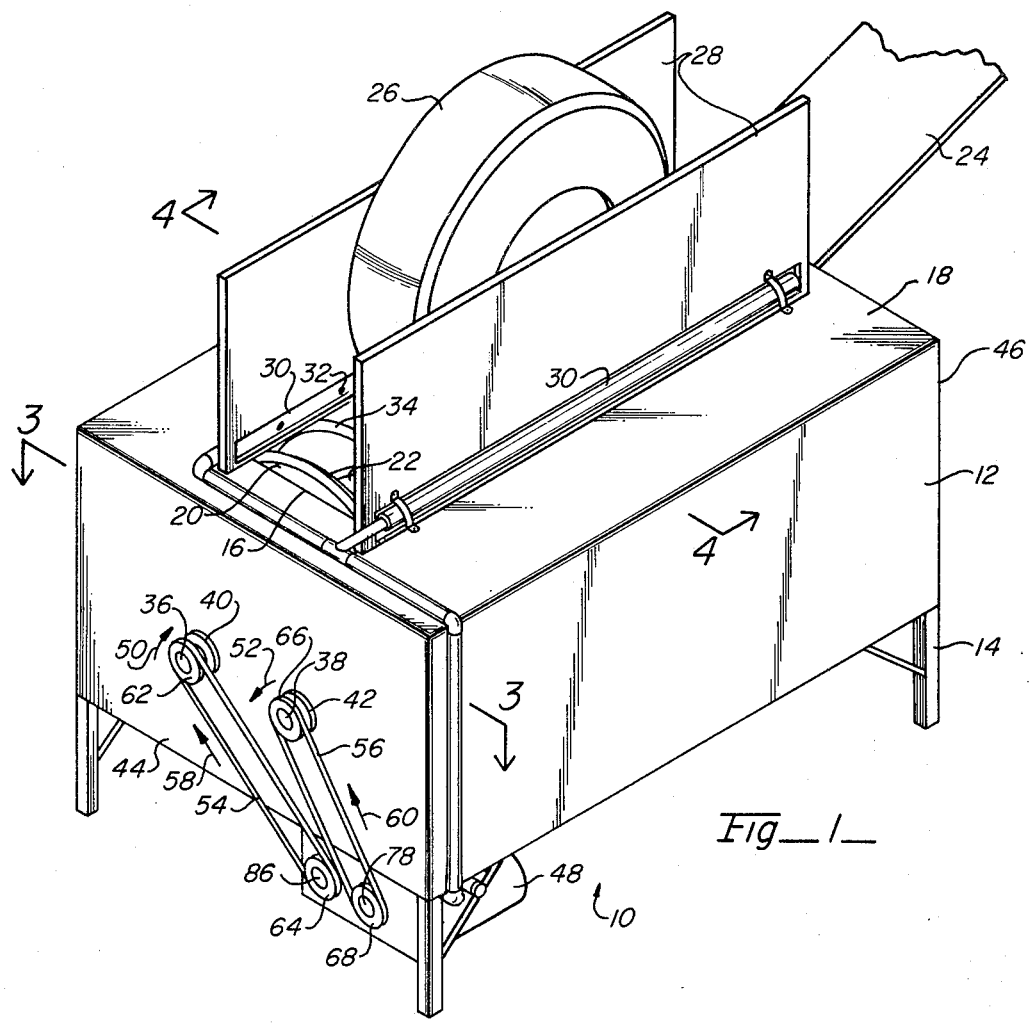
Fig_1_
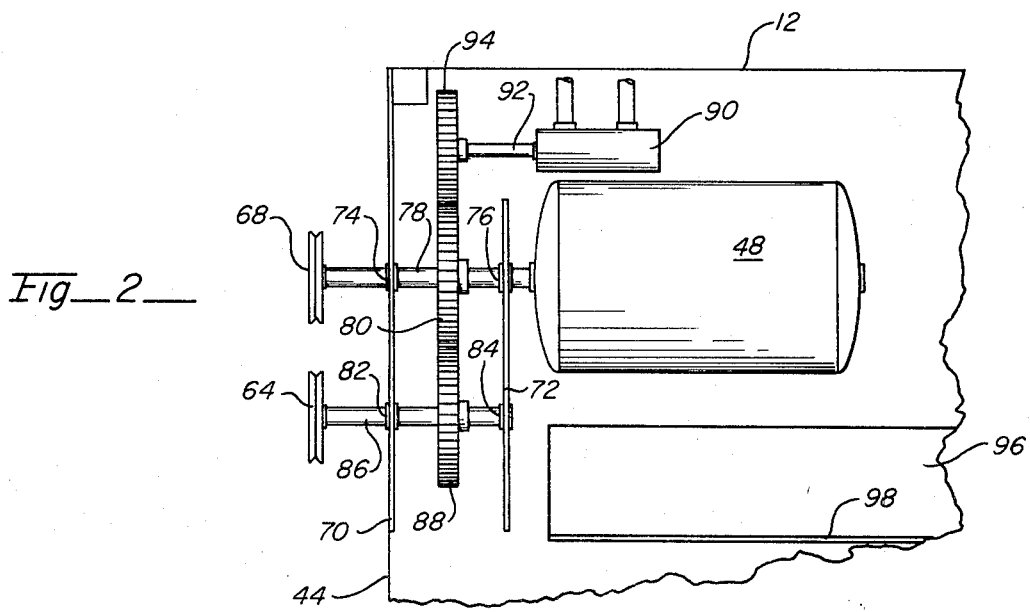
Fig_2_

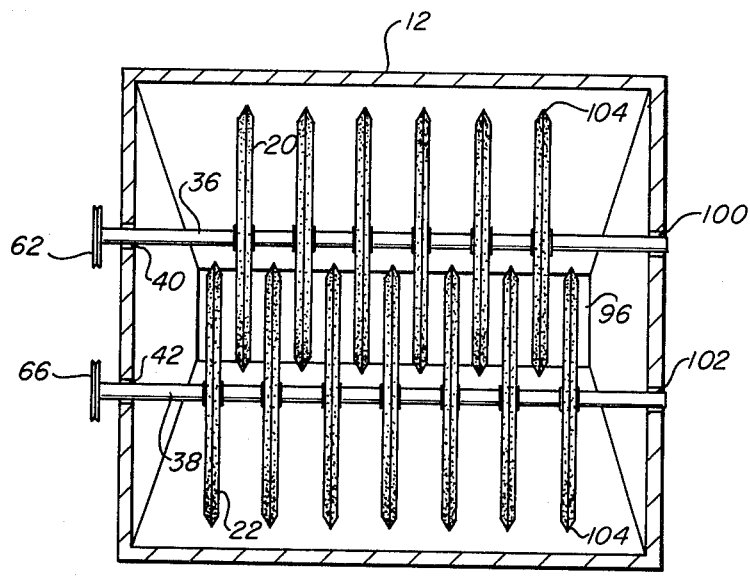
Fig_3_
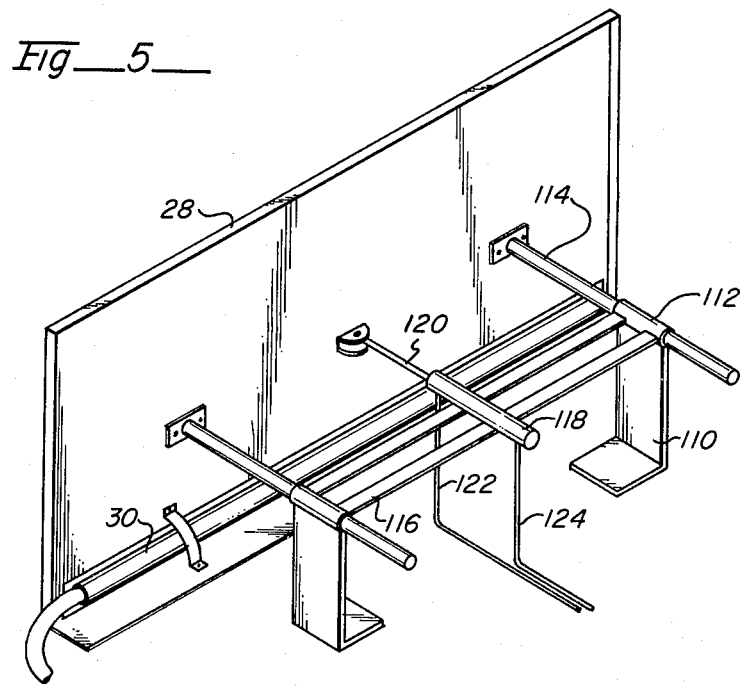
Fig_5_

U.S. Patent Nov. 25, 1980 Sheet 3 of 3 4,235,383
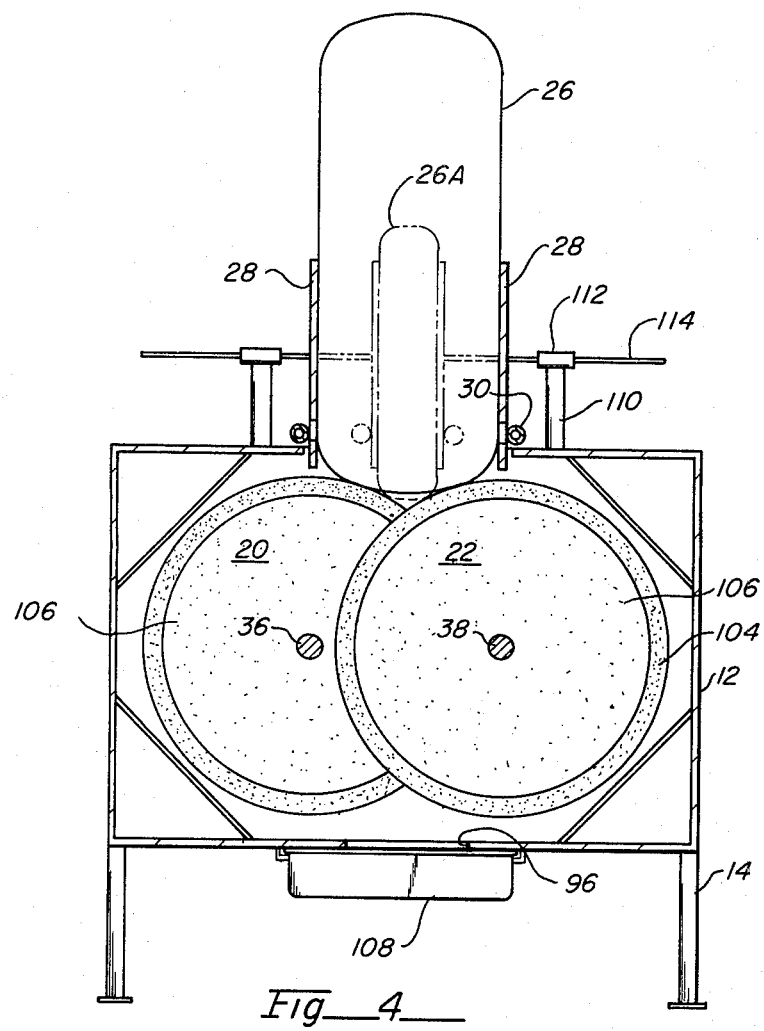
Fig_4_
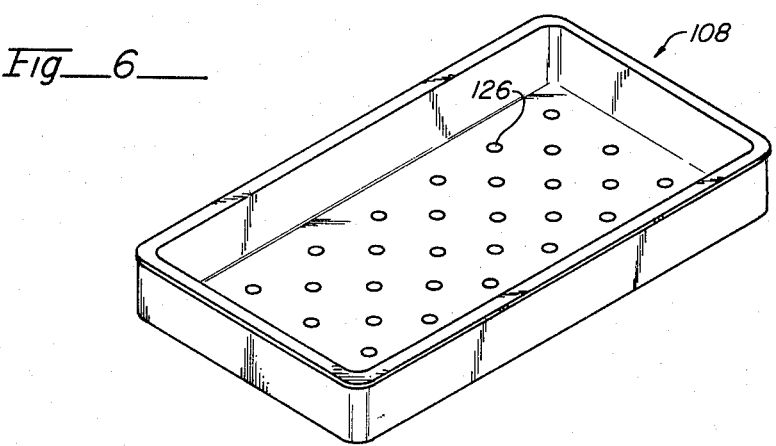
Fig_6_

TIRE DISINTEGRATOR

GOVERNMENT RIGHTS

The invention described herein may be manufactured and/or used by or for the Government for governmental purposes without the payment of any royalty thereon.

BACKGROUND OF THE INVENTION

There is a problem of disposing of worn or defective vehicle tires. Many are piled in areas adjacent automotive filling stations for subsequent disposal. Since they are not bio-degradeable, local refuse depositories or "city dumps" prefer that they are disposed of elsewhere. Some American coastal states allow the dropping of such tires into deep water. Some become buffers on boats and docks to cushion impact as boats are docked. Some become guards in parking lots. Some become containers for gardeners and florists. Occasionally, a tire will become a sandbox or a tire swing tied to a tree in the back yard of a family residence having small children. Athletic departments use them in football conditioning programs and the Army uses some in obstacle courses. Erosion control is another use of some tires. The making of a novelty shower and beach shoes and door mats gets rid of other damaged tires. However, in spite of the foregoing, the supply of worn or defective tires continues to grow. Their disposal is an ever increasing problem. Burning the tires is unacceptable because of environmental objections. The resultant pollution makes burning totally unacceptable. The recycling of tire dust or residue into new tires or into paving materials shows great promise as a means of disposing of defective vehicle tires.

SUMMARY OF THE PRESENT INVENTION

In accordance with the present invention, worn out or damaged vehicle tires are reduced to a powdered or shredded state for easier disposal and, more important, for recycling into a variety of rubber products, including new tires. This residue can also be used in the manufacture of products used in resurfacing roads. It may be used as an additive used in U.S. Pat. No. 4,000,000 for Process for Recycling Asphalt Aggregate Compositions which issued Dec. 28, 1976 to Robert R. Mendenhall.

In a preferred embodiment, the tire disintegrator comprising the present invention includes a pair of parallel axle shafts carrying a plurality of abrasive wheels thereon. The wheel diameters are less than the spacing between the shafts. The wheels on each shaft are spaced therealong to permit passage of wheels on the other shaft therebetween. The shafts are counterrotating in a direction toward and downward relative to each other. This tends to pull the tires down between the counterrotating wheels as the wheels cut, grind, and pulverize the tires into a powdered or granular residue. The size of the residue particles depends upon the wheel spacing, speed of rotation, and grit or tooth size on the wheels. Preferably a No. 5 grit carburundum on a 24" diameter wheel rotating at 800 to 1200 rpm is used. The wheels are of 1" aluminum plate. An electromagnet below the wheels catches the metallic particles that were cut from the steel belted tires.

BRIEF DESCRIPTION OF DRAWINGS

FIG. 1 is a perspective view of the disintegrator with a tire being shredded,

FIG. 2 is a bottom view,

FIG. 3 is a plan view taken along the line 3—3 in FIG. 1,

FIG. 4 is an elevational view taken along the line 4—4 in FIG. 1,

FIG. 5 is a perspective view of an adjustable guide, and

FIG. 6 is a perspective view of the residue collector.

DETAILED DESCRIPTION OF ILLUSTRATIVE EMBODIMENTS

Reference is now made to FIG. 1 wherein there is shown the tire disintegrator 10 having a housing 12 mounted on base legs 14. Housing 12 has an opening 16 in its top cover 18, through which a plurality of disintegrator wheels 20, 22 may be seen. A chute 24 serves to guide a tire 26 onto the wheels to be ground into dust or granular particles. Side guides 28 serve to keep the tire 26 in an upright position for more efficient operation. Water spray lines 30 on guides 28 spray water through openings 32 onto the grinding surfaces 34 of the wheels to reduce dust and atmospheric pollution from the tire residue. The wheels 20, 22 are mounted on spaced, parallel shafts 36, 38 which are rotatably mounted in bearings 40, 42 on the end covers 44, 46 of housing 12. A shaft drive means such as motor 48 mounted on the housing 12 counterrotates shafts 36 and 38 as shown by arrows 50, 52 respectively. Belts 54, 56 interconnect pulley 62 with pulley 64, and pulley 66 with pulley 68 respectively. The direction of travel of belts 54, 56 is shown by arrows 58, 60.

The power source for counterrotating wheels 20, 22 is more clearly seen in FIG. 2. Here motor 48 is attached to the underside of housing 12, as are shaft mounting brackets 70, 72. Bearings 74, 76 receive the main drive shaft 78 which is directly connected to motor 48. A drive gear 80 and pulley 68 are mounted on shaft 78. Bearings 82, 84 receive auxilliary drive shaft 86 onto which pulley 64 and driven gear 88 are mounted. Drive gear 80 and driven gear 88 mesh and provide pulleys 64, 68 with substantially equal but opposite RPM's.

Drive gear 80 may also be used to power a hydraulic pump 90 which is also attached to the housing 12. Pump 90 has a rotatable shaft 92 having a gear 94 attached thereto. Gear 94 meshes with drive gear 80 to provide pump 90 with a continuous source of power. This may be used to operate a hydraulic piston to move the side guides 28 in FIG. 1 in and out as needed, and as hereinafter explained with reference to FIG. 4. An opening 96 in the bottom of housing 12 permits collection of the tire residue in an appropriate container or with conveyor apparatus for suitable storage or transportation. Electromagnets 98 collect metal fragments from steel belted tires.

FIG. 3 is a plan view taken along line 3—3 in FIG. 1. Here is shown housing 12 with bearings 40, 42, 100, 102 in the ends of the housing to receive the parallel shafts 36, 38. These shafts have a plurality of abrasive wheels 20, 22 spaced thereon to permit passage of wheels on the other shaft therebetween. The wheel diameters are less than the spacing between the shafts so that they may be rotated without shaft interference. Pulleys 62, 66 are connected to a power source, such as shown in FIG. 1, to achieve rotation of the abrasive wheels. Housing 12 has an opening 96 in the bottom thereof through which the tire residue may drop after the tire has been pulverized. Between the shafts 36, 38, the abrasive wheels rotate toward each other and downwardly in counterrotation. This tends to bite or grip the tire between the two sets of wheels and urge the tire downwardly with a resulting increased abrasive action. It should be noted that the circumference or rim 104 is pointed to produce a cutting action as well as an abrasive action.

FIG. 4 is an elevational view taken along line 4—4 in FIG. 1. Here can be seen how a tire 26 is held by side guides 28 so that the tread contacts both wheels 20 and 22 between and above wheel shafts 36, 38. Not only is the rim 104 pointed and abrasive, but the side surfaces 106 are also abrasive to further reduce the particle size of tire residue as it passes between adjacent wheels.

A residue collector 108 is positioned under opening 96 in the bottom of housing 12 which, of course, may be emptied when full. Depending upon the desired operation, the residue may be dropped through the opening 96 into a large pile without using this collector, or a conveyor system may be used to transport it away from the disintegrator as desired.

It has been found that when a tire is positioned between the two sets of abrasive wheels and the tire is in a substantially vertical position, its weight is concentrated over a small "bite" area and no additional weight is needed in keeping the tire in contact with the counterrotating abrasive wheels. This positioning is best achieved with the side guides 28 bearing against the sides of the tire 26. The spacing between the side guides is made adjustable to accomodate a smaller tire 26A as shown in phanton lines. The water spray lines 30 preferably are affixed to these guides and move with them. Not only does the water spray keep down the tire dust but is also keeps the tires and abrasive wheels cool so that frictional heat will not melt the tires and clog up the abrasive wheels.

Apparatus for adjusting the spacing between the side guides 28 is shown in FIG. 5. A pair of mounting brackets 110 are adapted for mounting on the top of the housing 12 adjacent opening 16. Each bracket has a sleeve 112 through which a guide rod 114 may slide. Each guide rod is fastened to and supports a side guide 28. Extending between sleeves 112 are a pair of supports 116 onto which a hydraulic cylinder 118 is mounted. The hydraulic piston 120 is attached to the side guide 28 to give it lateral movements. Hydraulic lines 122, 124 extend to a hydraulic source, not shown. The operator's actuating lever also is not shown.

FIG. 6 is a perspective view of a residue collector 108. Openings 126 in the bottom permit water drainage. As previously mentioned, the type of residue collector depends upon the operation, storage or removal desired by the operator.

The invention in its broader aspects is not limited to the specific combinations, improvements and instrumentalities described but departures may be made therefrom within the scope of the accompanying claims without departing from the principles of the invention and without sacrificing its chief advantages.

What is claimed is:

1. A tire disintegrator for grinding defective tires into a residue for recycling, said disintegrator comprising:
    a first set of spaced, axially aligned abrasive wheels,
    a second set of spaced, axially aligned abrasive wheels,
    said first set and said second set being mounted on parallel axle shafts,
    said axle shafts being spaced apart a distance greater than the radius of said wheels,
    means counterrotating each set downwardly and toward each other to frictionally retain tires places thereover in abrasive contact with said wheels,
    said wheels enclosed within a housing, said housing having a top opening in the top thereof through which tires may be inserted and a bottom opening at the bottom thereof through which tire residue may pass,
    a pair of side guides adjacent said top opening to maintain tires in a substantially upright position over said wheels,
    said tire guides being laterally adjustable to receive tires therebetween of various widths.

2. A tire disintegrator as set forth in claim 1, and a receptacle under said bottom opening to receive said residue.

3. A tire disintegrator as set forth in claim 1 wherein coolant spray means is attached to said cabinet adjacent said top opening to cool said wheels and to dampen said residue.

4. A tire disintegrator as set forth in claim 1 wherein hydraulic means is operable for laterally adjusting said side guides.

5. A tire disintegrator as set forth in claim 1 wherein coolant spray means is attached to said side guides to cool said wheels and to dampen said residue.

* * * * *